O. S. Judd,
Sash-Cord Guide.
No 5,626.   Patented June 13, 1848.
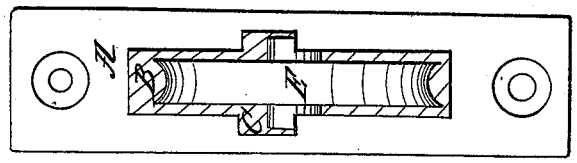
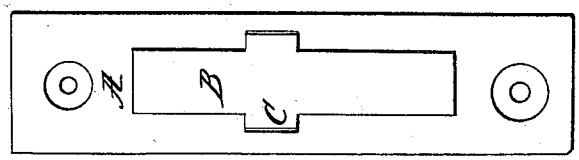
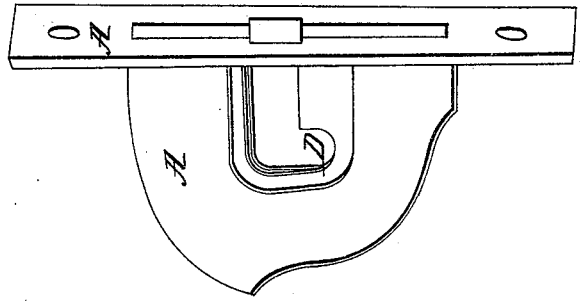

UNITED STATES PATENT OFFICE.

OLIVER S. JUDD, OF NEW BRITAIN, CONNECTICUT.

PULLEY FOR WINDOW-SASH.

Specification of Letters Patent No. 5,626, dated June 13, 1848.

*To all whom it may concern:*

Be it known that I, OLIVER S. JUDD, of New Britain, in the county of Hartford and State of Connecticut, have invented a new and useful Improvement on Window-Frame Pulleys, of which the following is a full and exact description, reference being had to the annexed drawing of the same, making part of this specification.

The apparatus containing my invention and improvement consists in a frame (marked A,) cast in one piece, from iron or other metal, with an opening for wheel in front (marked B); also a cavity for axle (marked C,) the opening for wheel passing through the frame, the cavity for axle extending into the frame, at the termination of which a depression (marked D,) is made, into which the axle drops, securing axle and wheel (marked E,) to their desired positions in the frame. Constructed upon this principle the axle and wheel can be taken out at any time for the adjustment of the cord, and replaced with the cord upon it—an advantage which will be readily seen, in saving of time and trouble attendant with all other window pulleys in getting the cord to its place, by being obliged to pass it up over the wheel, and work it down behind the window frame to the weights below. They can also be afforded to the market at a less price than any axle pulley now in use.

What I claim as my invention, and wish to secure by Letters Patent, is—

The casting of the frame in one piece, with a cavity in front to admit both wheel and axle at the same time—the cavity for the axle extending into the frame sufficiently to admit the wheel so far as to leave its proper projection in front of the frame face, and having at its end a suitable depression, into which the axle drops, and which serves as bearings to keep the wheel in its place.

OLIVER S. JUDD.

Witnesses:
MARCELLUS CLARK,
F. T. STANLEY.